United States Patent
Shimasaki et al.

(10) Patent No.: US 6,917,128 B2
(45) Date of Patent: Jul. 12, 2005

(54) ELECTRIC BLOWER

(75) Inventors: Tetsuo Shimasaki, Nanjyo-gun (JP); Shigeaki Fujiki, Nanjyo-gun (JP); Makoto Ueno, Nyu-gun (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 11/001,074

(22) Filed: Dec. 2, 2004

(65) Prior Publication Data

US 2005/0099070 A1 May 12, 2005

Related U.S. Application Data

(62) Division of application No. 10/846,707, filed on May 17, 2004, now Pat. No. 6,861,774.

(30) Foreign Application Priority Data

May 16, 2003 (JP) ........................................ 2003-138855

(51) Int. Cl.[7] .............................................. H02K 9/00
(52) U.S. Cl. ........................... 310/58; 310/194; 310/270
(58) Field of Search ......................... 310/52–59, 62–63, 310/194, 254, 260

(56) References Cited

U.S. PATENT DOCUMENTS

| 3,800,173 A | * | 3/1974 | Rosenberry, Jr. | 310/59 |
|---|---|---|---|---|
| 4,085,344 A | | 4/1978 | Eddens | 310/58 |
| 4,379,975 A | * | 4/1983 | Kitajima | 310/59 |
| 6,469,408 B2 | * | 10/2002 | Asao | 310/62 |
| 6,617,739 B1 | | 9/2003 | Kinoshita | 310/198 |
| 6,707,216 B2 | | 3/2004 | Han et al. | 310/211 |

FOREIGN PATENT DOCUMENTS

| JP | 59-25957 | 2/1984 |
|---|---|---|
| JP | 10-42534 | 2/1998 |

* cited by examiner

Primary Examiner—Thanh Lam
(74) Attorney, Agent, or Firm—Parkhurst & Wendel, L.L.P.

(57) ABSTRACT

A compact and light electric blower which is improved in wiring cooling capability without reducing the airflow efficiency. The electric blower includes a spool attached to end surfaces of a field core fixed to a motor frame of which outer periphery portion is in an approximately cylindrical shape, and field wiring each wound across the field core and the spool, wherein a gap capable of passing air is formed between the coil end between slots of the field wiring and the field core, and each spool is provided with a wall surface which narrows the airflow section formed between the field core and the motor frame while forming a periphery portion of the field wiring.

1 Claim, 7 Drawing Sheets

ELECTRIC BLOWER

This is a Division of application Ser. No. 10/846,707 filed May 17, 2004, now U.S. Pat. No. 6,861,774, which claims the benefit of Japanese Application No. 2003-138855 filed May 16, 2003.

TECHNICAL FIELD OF THE INVENTION

The present invention relates to an electric blower included in an electric appliance such as an electric cleaner, and particularly relates to an electric blower enhanced in the effect of reducing wiring temperature by allowing suction air to flow inside an electric motor.

BACKGROUND OF THE INVENTION

A half cross-sectional view of a conventional electric blower is shown in FIG. 7. In FIG. 7, reference numeral 1 denotes a field core, reference numeral 2 denotes a field winding, reference numeral 3 denotes a spool, reference numeral 4 denotes an armature assembly, reference numeral 5 denotes a motor frame, reference numeral 6 denotes a rotary fan, and reference numeral 7 denotes an air guide. For the electric motor for driving the rotary fan 6 to obtain a suction force, a comutator motor which easily rotates at high speed is used. FIG. 8 shows a plan view only of an electric motor section of a conventional electric blower without a rotary fan and an air guide. In FIG. 8, the field core 1 is fixed in the approximately cylindrical motor frame 5, and such a cross section that facilitates airflow is provided at an outer periphery of the field wiring 2.

The spool 3 is disposed at end surfaces of the field core 1, and a pair of field wirings 2 are arranged around the outer periphery of the spool 3 to form a field assembly. The field assembly is accommodated inside the approximately cylindrical motor frame 5 which is opened at one side, and a space 11 is secured between the field wirings 2 and the motor frame 5. The rotary fan 6 is mounted to an output shaft of the armature assembly disposed inside the field assembly, the air guide 7 is disposed at the outer periphery of the rotary fan 6, and a fan case 10 for covering the rotary fan 6 and the air guide 7 is provided, whereby an airflow passage is formed.

Next, an operation will be explained. When the rotary fan 6 located at the shaft end of the motor is rotated, the air taken in from the rotary fan 6 is guided into the motor via the air guide 7, then passes through the airflow section 11, which is formed between the field core 1 and the motor frame 5, and passes between the field assembly and the armature assembly, and thereafter, the air is discharged outside. The air passing between the field assembly and the armature assembly receives heat transmission from the wirings, and contributes to reduction in wiring temperature. However, most of the air passing through the airflow section 11 formed between the field core 1 and the motor frame 5 is discharged outside the motor without receiving heat transmission from the wirings because there is less airflow towards the vicinity of the wirings.

As the means for suppressing the rise in the wiring temperature of such a motor, there is shown an example of improvement in which a wall is added for closing the airflow section 11 between the end surface of the field core 1 at the side of the fan and the motor frame 5, and thereby the air entering from the fan is passed inside the field core 1 to cool the field wirings 2 and the armature wiring (for example, see Japanese Utility Model Laid-Open No. 59-25957).

There is also shown a configuration in which the inner periphery wall of the spool is inclined inward from the inner diameter of the field core so that it is possible to wind the field wirings 2 inward from the inner diameter of the field core while securing a space between the inner periphery wall of the spool and the armature wiring in order to enhance the effect of cooling the stator and brush for the purpose of enhancement in efficiency and reduction in weight of the motor (for example, see Japanese Patent Application Laid-Open No. 10-42534).

However, in the above-described conventional electric blower, when the air passing inside the motor passes near the wirings, the temperature of the air rises by receiving heat transmission from the wirings, but the air passing through the airflow passage distant from the wirings is discharged outside the motor without receiving heat transmission. The wiring disposed at the side of the fan has a large cooling effect because air flowing from the fan directly blows at the wiring, but the wiring disposed at the opposite side from the fan has a small cooling effect because the temperature of the air passing by has already risen with the heat transmitted from the wiring at the side of the fan. Further, the air flowing near the motor frame distant from the wirings is discharged outside the motor without performing the operation of cooling the wirings, and therefore cooling effect of the wiring is especially low at the opposite side of the fan.

In the configuration in which the air entering from the fan is passed to an inside of the field core by adding the wall for closing the airflow sectional area between the field core end surface at the side of the fan and the motor frame so that the field wirings and the armature wiring are cooled, thereby to improve the wiring cooling effect of air which passes inside the motor, an airflow does not exist in the section formed between the field core and the motor frame. Therefore, there exists a problem that the cooling effect of the field wiring at the opposite side of the fan is weak, and the temperature difference between the field wirings at the fan side and the opposite side of the fan is large. Further, there exists another problem that the pressure loss of the airflow increases, and the blower efficiency reduces because the sectional area through which the air discharged from the fan can enter the motor becomes small.

With the configuration in which the inner periphery wall of the spool is inclined inward to shorten the coil end between the slots of the field wiring, the effect of the guide for guiding wind to the commutator disposed inside the field wirings can be obtained. However, since the inner periphery wall of the spool exists in each space formed adjacent the field wirings, the wind which passes between the field assembly and the armature assembly is discharged without receiving transmission of the heat from the field wirings. In addition, with this configuration, the field wirings hardly expose outside from the field core so that air flowing outside the field hardly hits the filed wirings either. Thus, cooling capability of the field wirings is reduced, and rise in the temperature of the field wirings is increased.

Because of these problems, the rise in temperature of the wirings becomes high when the power consumption is made large, and therefore the improvement means for suppressing the wiring resistance by increasing the physical constitution of the motor is required. For this purpose, improvement in the cooling performance which makes it possible to reduce the size and weight of the motor is strongly demanded.

In order not to reduce the efficiency of the electricblower, such an improvement is demanded to enhance the wiring cooling performance while suppressing the increase in loss of inflow into the motor as a blower.

DISCLOSURE OF THE INVENTION

An object of the present invention is to provide a compact and light electric blower which is improved in rise in wiring temperature while securing the efficiency as the blower.

The present invention is made in view of the above-described problems. In order to achieve the object, an electric blower of the present invention comprises: a field assembly having a field core with an outer periphery portion being fixed to a motor frame; an armature assembly disposed inside the field core, and including an armature core made of a laminated core and housing an armature wiring inside a slot, the armature assembly also including an output shaft is at a center thereof; an approximately cylindrical motor frame housing the field assembly; a rotary fan fixed to the output shaft; a spool attached to end surfaces of the field core; and field wirings wound across the field core and the spool, wherein a gap capable of passing air is provided between a coil end between the slots of the field wiring and the field core, and wall surfaces which are formed between the field core and the motor frame are mounted to the spool so as to narrow airflow sections that form outer periphery portions of the field wirings.

When the rotary fan provided at the shaft end of the motor is rotated, air which is sucked from the rotary fan is guided into the motor via the air guide, then the air guided by the walls of the spool, which are protruded to the outer periphery of the field wirings, passes through the a gap capable of passing the air that is formed between the coil end between the slots of the field wiring and the field core, and is discharged outside after passing between the field assembly and the armature assembly.

The gap capable of passing air is provided between the coil end between the slots of the field wiring and the field core, and the spool is provided with the wall surface formed between the field core and the motor frame so as to narrow the airflow section that forms the outer periphery portion of the field wiring, thereby generating the first flow which is guided to the field wiring by the wall surface of the spool at the opposite side of the fan to cool the wiring after flowing along the motor frame from the gap between the wall surface of the spool disposed at the end surface of the field core and the motor frame. And a second flow which is guided by the wall surface protruded to the outer periphery of the field wiring of the spool, passes through the gap capable of passing air that is formed between the coil end between the slots of the field wiring and the field core, and cools the field wiring and the armature wiring. Thus, the advantageous effect of improving the temperature rise can be obtained without reducing the airflow efficiency with each of the first and second flows having high capability of cooling the wirings.

As a result, the rise in the wiring temperature which becomes the problem in terms of reduction in size of the electric blower and rise in power consumption can be improved, and the electric blower with light weight and high reliability can be obtained.

Further, the electric blower of the present invention is characterized in that the spool attached to an end surface of the field core on the rotary fan side is provided with a gap capable of passing air to a circumference of the air flow section in the vicinity of the motor frame, the airflow section being formed between the field core and the motor frame and forming the outer periphery portion of the field wiring. Also, the spool is provided with a wall surface for blocking an airflow only in the vicinity of an inside of the gap.

By this configuration, the air which is guided into the motor along the motor frame is divided into the flow entering along the motor frame from the gap between the motor frame and the wall surface of the spool, the flow into the inside of the field assembly, and the flow to the outer periphery of the core yoke portion connecting a pair of the field wirings.

Further, the electric blower of the present invention is characterized in that the spool attached to an end surface of the field core at an opposite side of the rotary fan is provided with a wall for blocking an airflow at a side of the motor frame, and there is a hole or a gap formed to be capable of passing air at an outer periphery of the spool in the vicinity of the field wiring in the airflow section which is formed between the filed core and the motor frame, the airflow section forming the outer periphery portion of the field wiring.

According to this configuration, the air flowing into the motor along the motor frame changes the direction of the flow to the side of the field wiring by the wall surface of the spool disposed near the motor frame, and is divided into the flow entering the armature side from the gap capable of passing the air between the coil end between the slots of the field wiring and the field core, and the flow flowing out to the wind hole of the motor frame after hitting the field wiring.

The electric blower of the present invention comprises: a field assembly having spool attached to end surfaces of a field core and a field wiring wound across the field core and the spool; an armature assembly including an armature core disposed inside the field core and housing an armature wiring in a slot and an output shaft at a center thereof, the armature core being made of a laminated core; and a rotary fan fixed to the output shaft are disposed, characterized in that a plurality of raised columns extending inward from an inner diameter of the field core are included at the spool, and an innermost diameter of exposed portion of the field wiring exposed between the raised columns is made smaller than the inner diameter of the field core.

According to this configuration, the air passing between the field core and the armature core and flowing to the opposite side of the fan is discharged from the wind hole of the motor frame after hitting the exposed portion of the field wiring exposed between the raised columns at the spool, thus contributing to improvement of rise in the field wiring temperature at the opposite side of the fan. Further, the coil end of the wiring can be made small, thus contributing to the reduction in weight. The outward deviation of the wiring becomes small, thus obtaining the advantageous effect of facilitating mounting a component such as a temperature detecting sensor to the outer periphery portion of the wiring.

DESCRIPTION OF THE EMBODIMENTS

Hereinafter, embodiments of the present invention will be explained with reference to the drawings.

(Embodiment 1)

Figure 1:
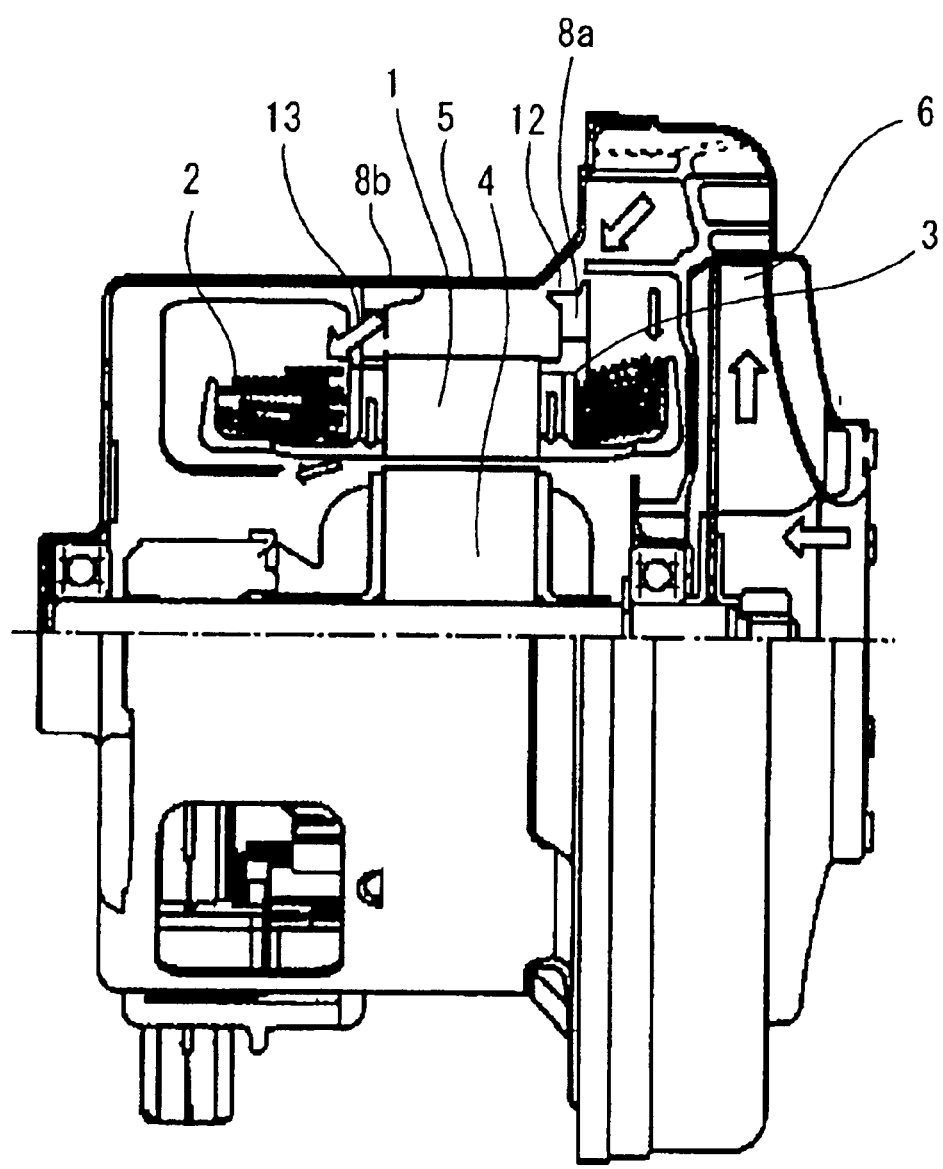
FIG. 1 shows a half cross-section of an electric blower according to one embodiment of the present invention.

FIG. 1 shows a half cross-sectional view of an electric blower according to one embodiment of the present invention. In FIG. 1, reference numeral 1 denotes a field core, reference numeral 2 denotes a field wiring, reference numeral 3 denotes a spool, reference numeral 4 denotes an armature, reference numeral 5 denotes a motor frame, reference numeral 6 denotes a rotary fan, reference numerals 8a and 8b denote wall surfaces of the spool.

Here, a flow of air which flows into the motor will be explained. The air discharged from the rotary fan 6 flows inside the motor along the motor frame 5, and is separated into a first flow (thick arrow) which is guided to the field winding 2 by the wall surface 8b of the spool 3 at the opposite side of the fan after flowing along the motor frame from a gap 12 between the wall surface 8a of the spool 3 disposed at the end surface of the field core 1 and the motor frame 5, a second flow (thin arrow) which is guided by the wall surface 8a protruded to an outer periphery side of the field winding 2 of the spool 3, and passes through a gap capable of passing the air, which is formed between a coil end between the slots of the field winding 2 at the side of the fan to cool the wiring of the field wiring 2 and the armature 4, and a third flow (thin arrow) which passes through a gap capable of passing air, which is formed between a coil end at the opposite side from the fan and the field core 1 by the wall surface 8b of the spool 3 at the opposite side from the fan after flowing along the motor frame to cool the wiring of the field wiring 2 and the armature 4.

Figure 2:
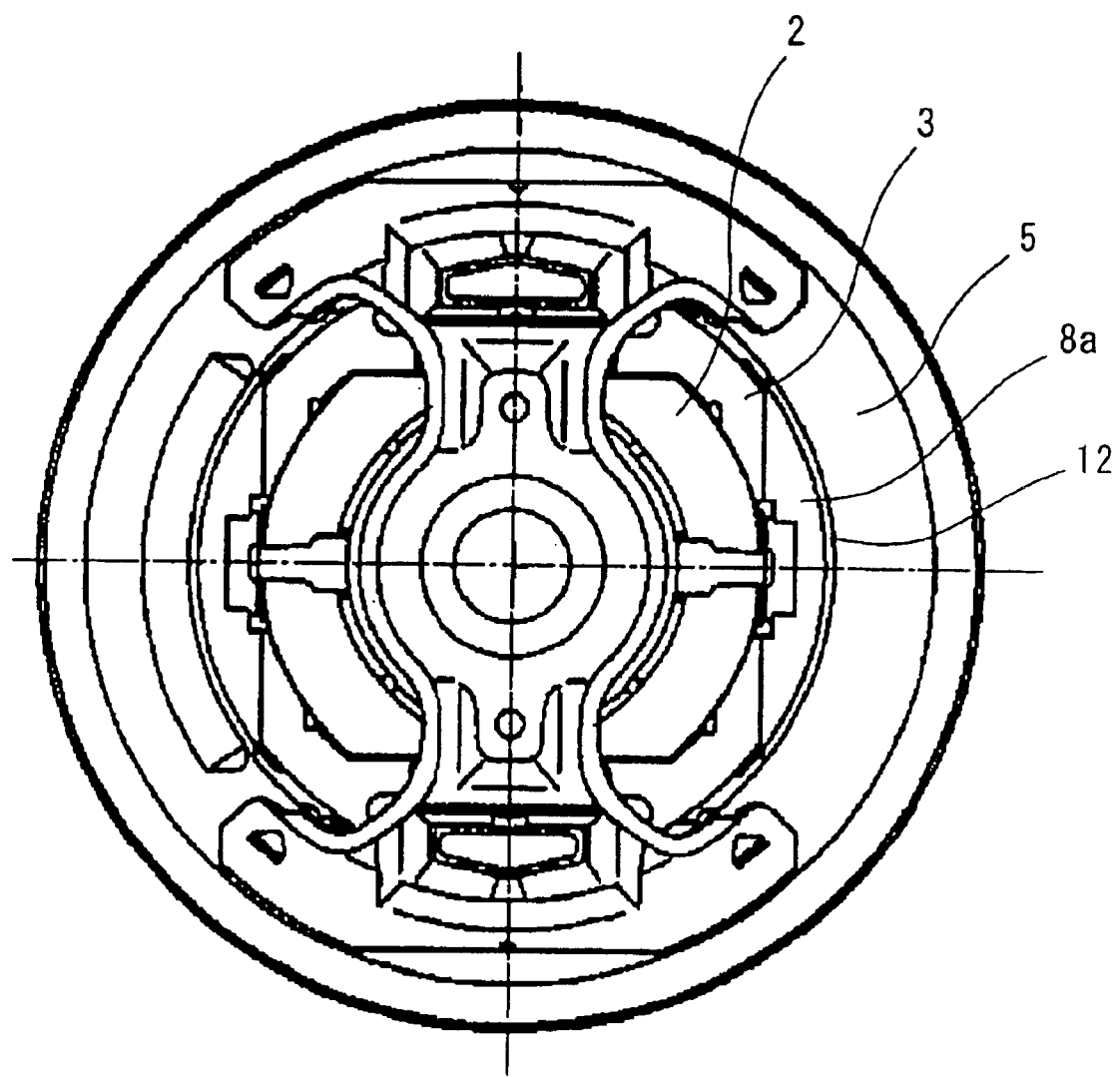
FIG. 2 shows an airflow inlet of a motor part of the electric blower according to the one embodiment of the present invention.

FIG. 2 shows an airflow inlet of the motor in a state in which the spool 3 of the present invention is disposed at the field core 1, and is mounted to the motor frame 5. The wall surface 8a of the spool 3 is provided with the annular gap 12 capable of passing air between the wall surface 8a and the motor frame 5, whereby the flow of the air is separated into two directions of the flow along the motor frame 5 and the flow along the wall surface 8a.

Figure 3:
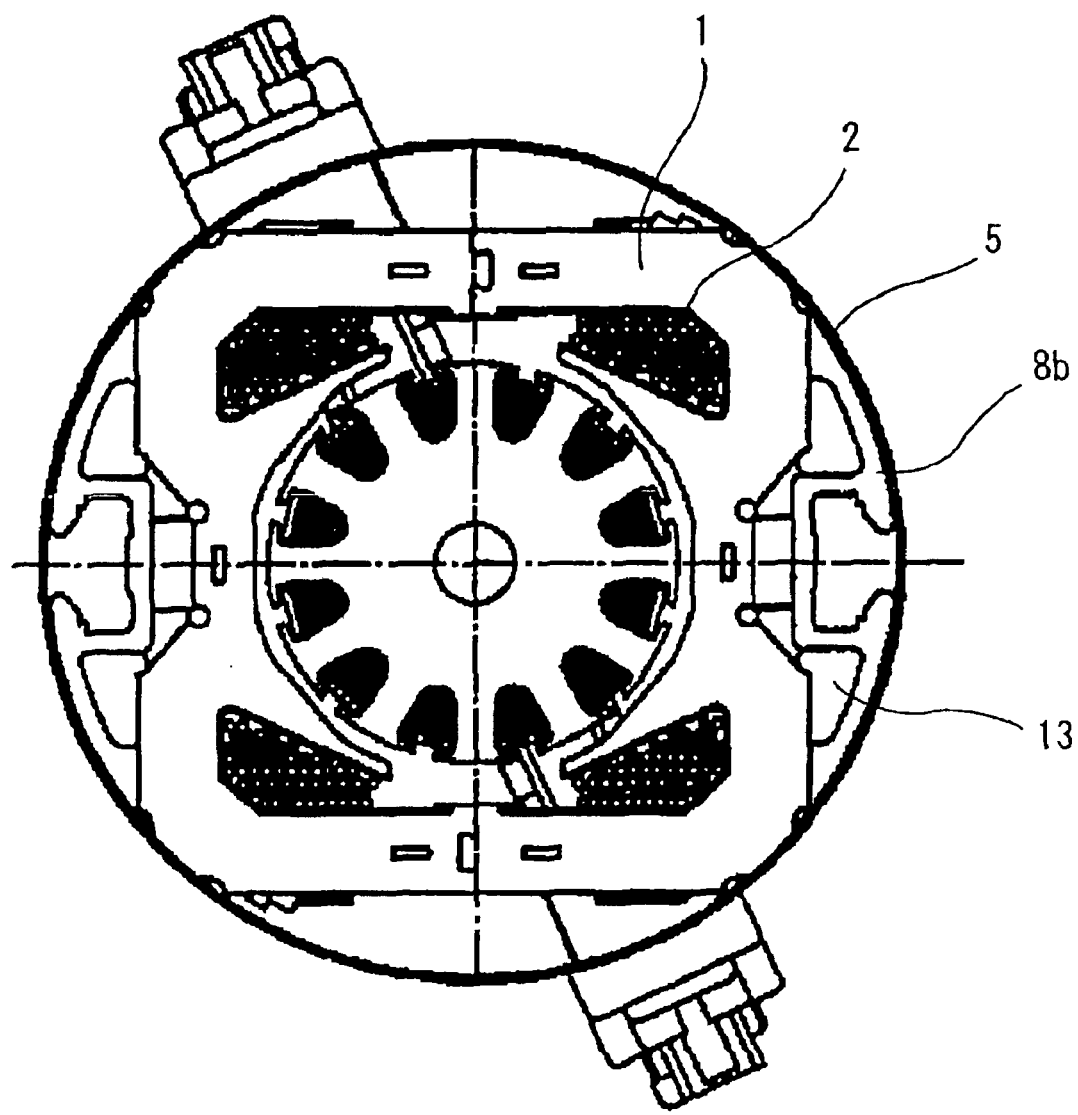
FIG. 3 shows a cross-section of a core portion of the motor of the electric blower according to the one embodiment of the present invention.

FIG. 3 is a view showing an airflow cross section at the motor core portion of the present invention. The outer periphery of the wall surface 8b of the spool 3 at the opposite side from the fan is placed in close vicinity to the motor frame 5, and a gap and a hole 13 capable of passing air are provided at the wall surface 8b in the vicinity of the field wiring. A part of the outer periphery portion of the wall surface may be cut so that the temperature protection device and the like can be mounted.

(Embodiment 2)

Figure 4:
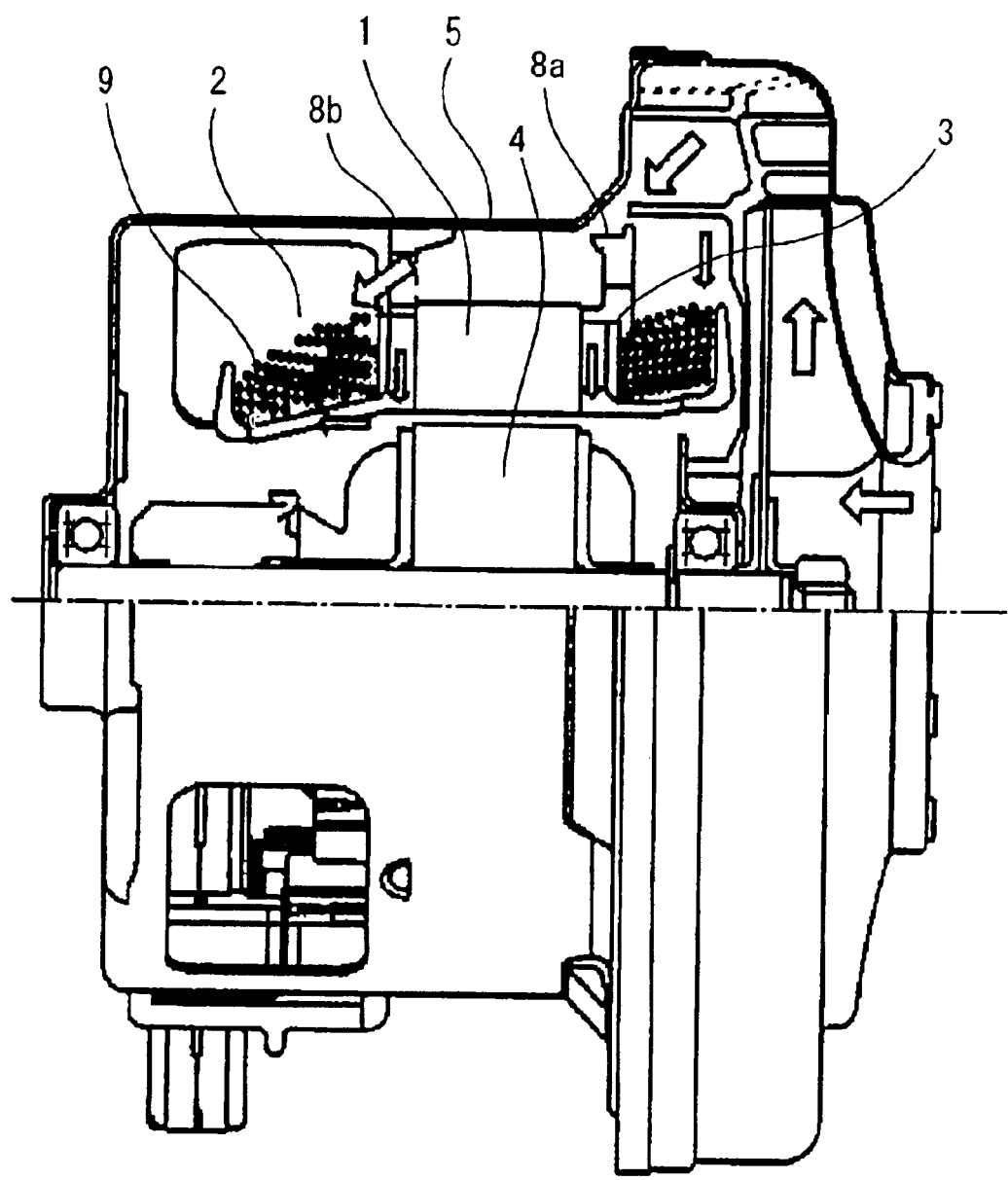
FIG. 4 shows a half cross-section of an electric blower according to a second embodiment of the present invention.

FIG. 4 is a half cross-sectional view of the electric blower according to a second embodiment of the present invention. A plurality of raised columns 9 extending inward from the inner diameter of the field core 1 are included at the spool 3 provided at the end surface of the field core 1 at the opposite side from the fan, and the innermost diameter of an exposed portion of the field wiring 2 exposed between the raised columns 9 is made smaller than the inner diameter of the field core 1.

Figure 5:
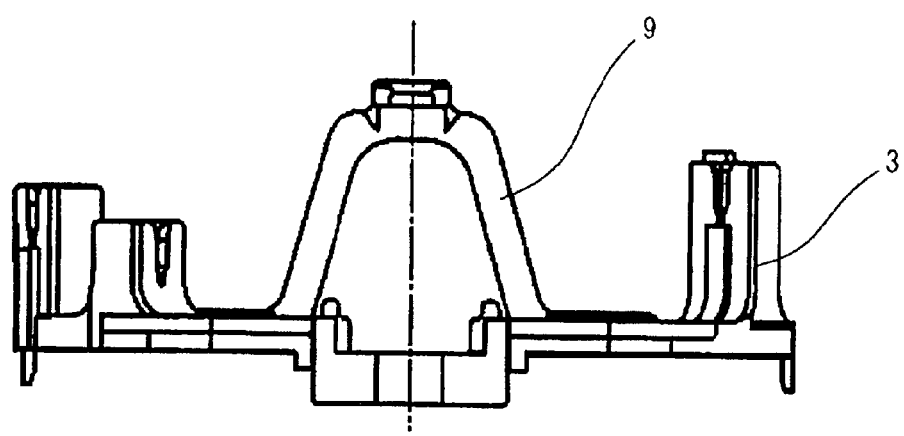
FIG. 5 shows a spool of the electric blower according to the second embodiment of the present invention.

FIG. 5 is a view showing a spool of an electric blower according to a second embodiment of the present invention. The spool 3 includes a terminal stand for holding a tip end of the field wiring 2 wound across the field core 1 and the spool 3 and a connection terminal, and two raised columns 9 for holding and fixing the coil end of the wiring are provided and connected to each other at the center.

(Embodiment 3)

Figure 6:
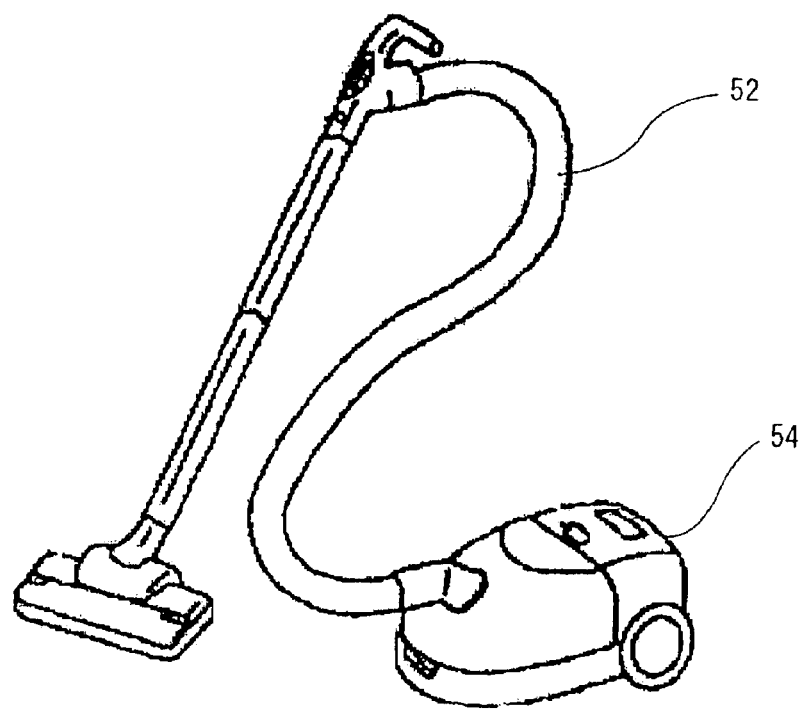
FIG. 6 shows an electric cleaner including the electric blower of the present invention.
Figure 7:
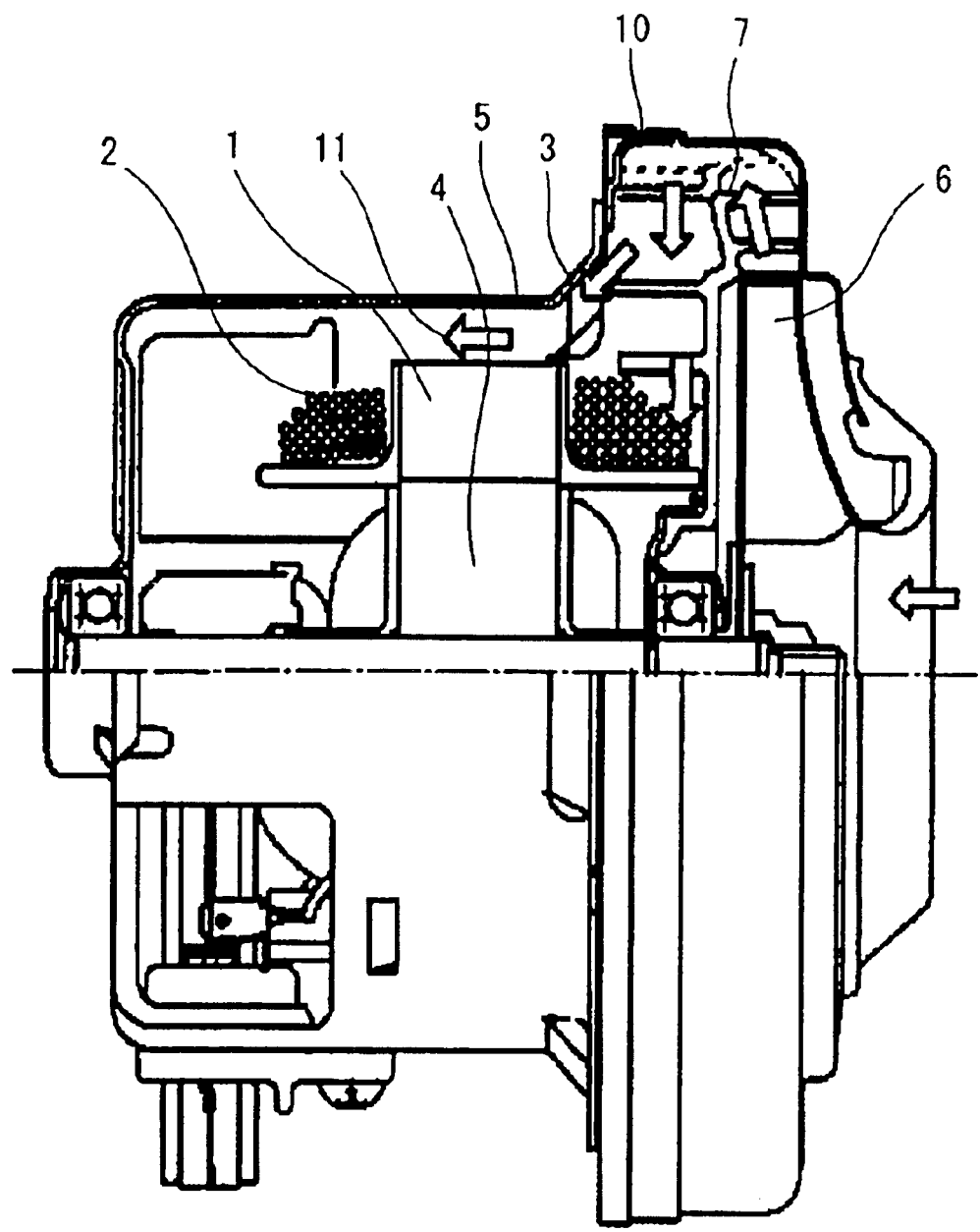
FIG. 7 shows a half cross-section of a conventional electric blower.
Figure 8:
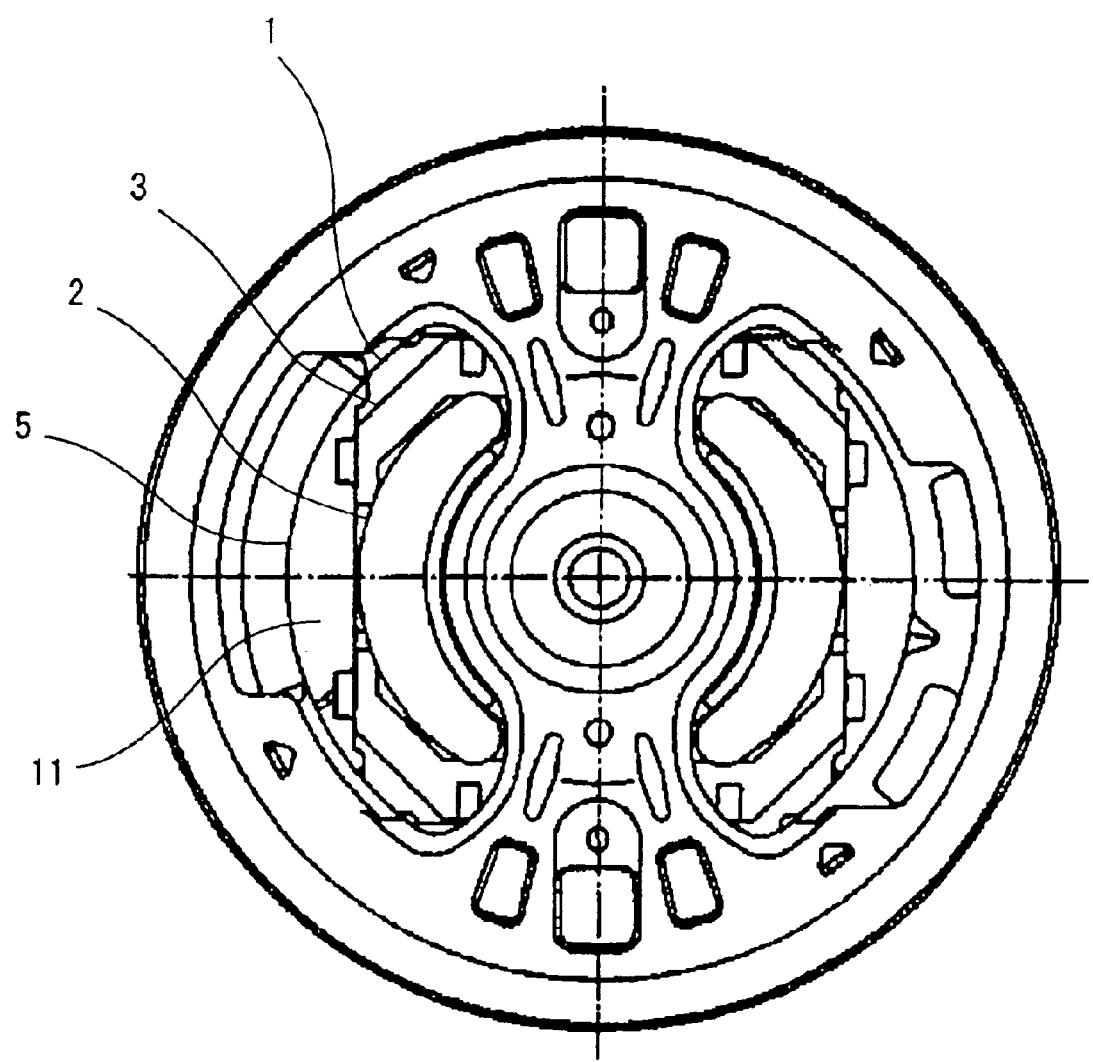
FIG. 8 shows an airflow inlet of an electric motor portion of the conventional electric blower.

FIG. 6 shows an electric cleaner loaded with the electric blower at a body 54. The electric cleaner sucks air including dust from a suction port via a hose 52, and the suction force is obtained by rotating a centrifugal fan 6 mounted to an output shaft of the electric blower. The electric blower with excellent wiring cooling ability and high blowing efficiency is used to obtain a large suction force with a small size and light weight.

What is claimed is:

1. An electric blower comprising:

a field assembly including a spool attached to an end surface of a field core, and a field wiring wound across the field core and the spool;

an armature assembly including an armature core located inside the field core, and housing an armature wiring in a slot and an output shaft at a center thereof, the armature core being made of a laminated core; and a rotary fan fixed to the output shaft, characterized in that the spool includes a plurality of raised columns extending inward from an inner diameter of the field core, wherein an innermost diameter of an exposed portion of the field wiring is made smaller than the inner diameter of the field core, the exposed portion being exposed between the raised columns.

* * * * *